United States Patent Office.

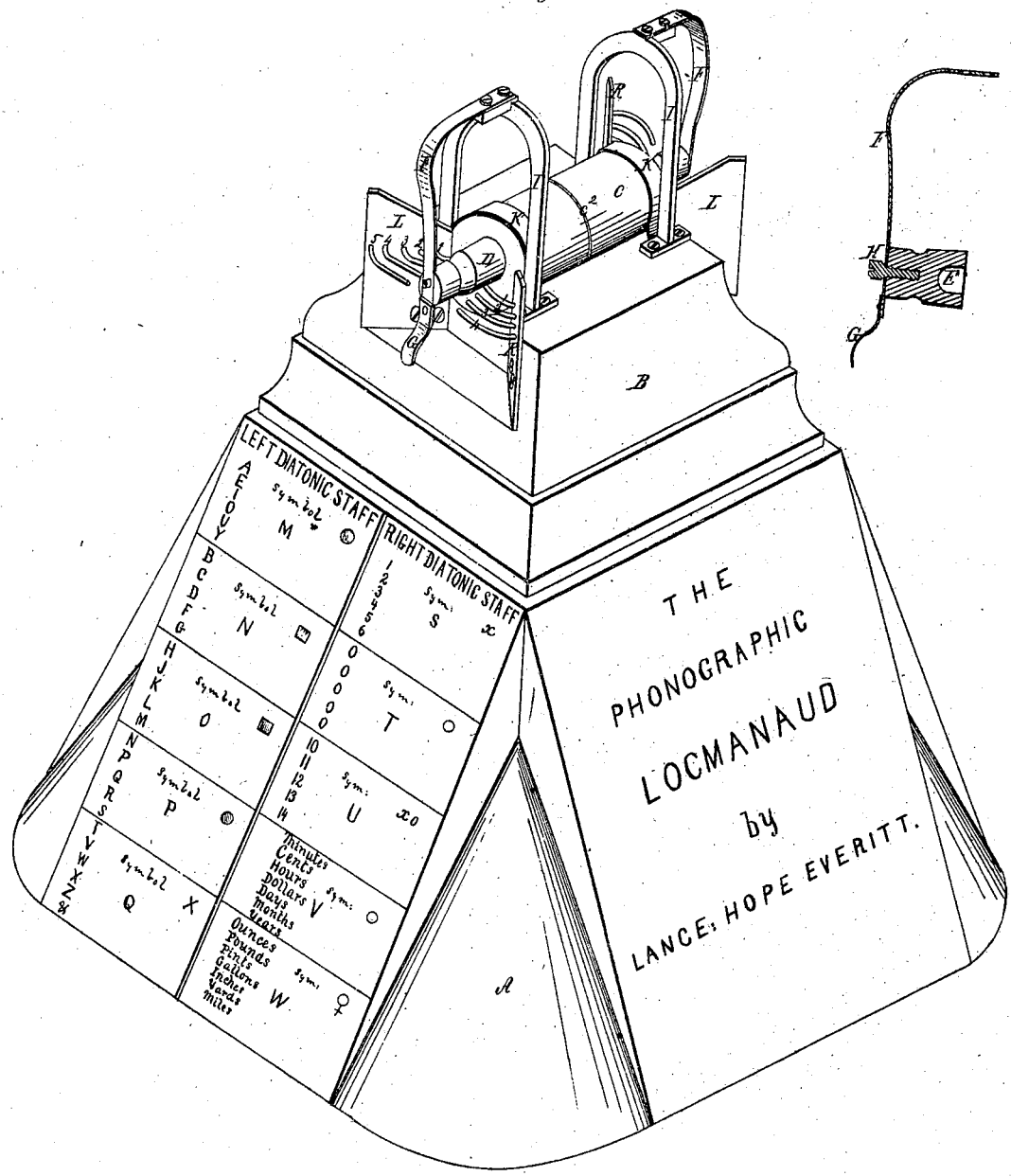

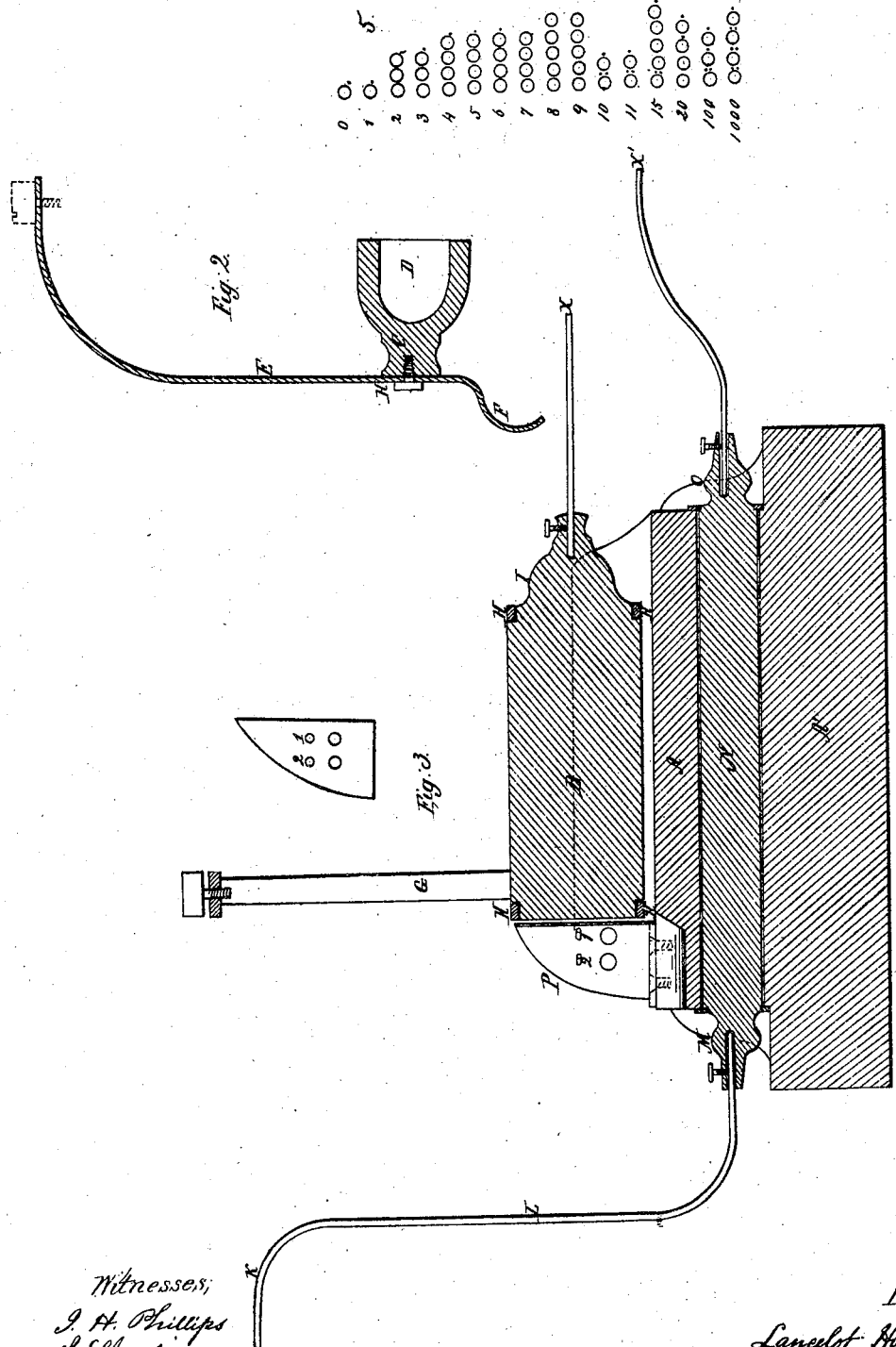

LANCELOT HOPE EVERITT, OF NEW ORLEANS, LOUISIANA.

IMPROVEMENT IN ACOUSTIC TELEGRAPHS.

Specification forming part of Letters Patent No. 40,616, dated November 17, 1863.

*To all whom it may concern:*

Be it known that I, LANCELOT HOPE EVERITT, of New Orleans, in the parish of Orleans and State of Louisiana, have invented a Phonographic Locmanaud, which creates, conveys, and communicates intelligence by means of similar and dissimilar intensities of sound, which, separately and combined, are made to represent the different letters of the alphabet, the various Arabic notations, and other valuations, according to certain phonic formulæ, each one of which is expressed by one or more symbols engraved on marble, for the use of the deaf and dumb blind, and tinted of various colors for those who can see.

The marble locmanaud is intended for the use of two deaf and dumb persons, as it stands upon a table between them. The auditor places himself in contact with the one side of the locmanaud, and receives the symbolic sounds which are evoked by the operator on the opposite side. As the various formulæ of letters are sounded by the operator, so are they conveyed by the locmanaud and received by the auditor, and by him combined into letters, words, and sentences, and thus the conversation begins and progresses until, the operator having finished his talk, he in turn places himself in contact with the locmanaud and becomes auditor; and in this way anatomical defection is improved in the most agreeable, instructive, and intelligent manner.

The name of the machine is composed of Greek and Latin words and syllables of words. "Phonographic" is composed of Greek words signifying an instrument that communicates intelligence by sounds. "Locmanaud" is composed of three Latin syllables of words—namely, "loc," of *locutus*, to speak; "man," of *manus*, the hand; "aud," of *auditum*, to hear. A phonographic locmanaud therefore means a machine that creates, conveys, and communicates intelligent sounds through the hands and speaks to the internal sense of hearing. The acoustic trumpets of the outer ear, finger and thumb tips, and copper wires have been implied rather than disturb the euphony of the name.

The great facility of acquiring the principles and practices of the phonographic locmanaud must forever recommend this mode of conversing with and conveying intelligence to the deaf and dumb—months, and not eight years, being in most cases all the time necessary to render the learning of this method effectual. It is also efficient with those who can hear, but, by length of distance from each other, are equally deaf and dumb. This is effected by a bisection, as at $C^2$, and connecting the two sections with long copper wire.

Another important use of the phonographic locmanaud is in enunciating and conveying sermons from a pulpit to a deaf and dumb audience. This is effected by copper wires centered in the facial incus of the battery and diverging fanlike toward the assembly—so many members, so many wires—the ends of which are held by the index-finger and thumb-tips; or, the ends being armed with small metallic nipples, they are inserted into the acoustic trumpet of the external ear. The clergyman evokes the different phonic formulæ at the key end of the battery, and the whole audience simultaneously receive, hear, arrange, and construe this phonographic language into the Word of Life; and I do hereby declare that the following is a full, clear, and exact description of the nature and construction and operation of the same, reference being had to the annexed drawings, making a part of this specification, in which—

Figure No. 2 is a vertical section of the malleus D and tympanum F, and Fig. 1 is a perspective view.

The nature of my invention therefore consists in eliminating sounds or phonic units of similar and dissimilar intensities and chimes from the non-metallic atoms of the atmospheric air, and so arranging them as to constitute a phonic formula for each letter of the alphabet, each notation, and valuation, every one of which is represented by its own distinguishing symbol. These symbols are sounded by the battery, and are so divided by the silent pauses (diatessarons are intervals divided into four unequal pauses of times and of numbers) of "diatessarons," as I call them, that the same symbolic sound denotes several letters when severally and continuously sounded, for pulpit and parlor purposes are divided into commas, colons, semicolons, and periods, according to a space of time necessary to count one, three, two, four, respectively.

To enable others skilled in the science of physics to make and use my invention, I will proceed to describe its construction and operation.

I construct my phonographic locmanaud in three different ways, so as to operate with it in the following three different forms. The one for parlor purposes may be represented as follows: It is pyramidal in form, having two faces—an anterior and a posterior—upon which the phonic orders and symbols and phonic formulæ of letters of the alphabet, Arabic notations, and valuations are engraved, so that the deaf and blind, the dumb and blind, may be instructed by it; and they are colored of various tints, that they may the more easily be memorized by the deaf and dumb who can see. There are also two lateral faces, upon one of which is engraved an explanation of the nature of sound and upon the other some of the uses of the machine.

Upon the marble base A the pedestal B, with the acouglottic battery, is placed and mounted. The several parts of the battery are named after the ossicula of the anatomical ear.

C is the incus. It forms the *point d'appui* upon which the different intensities of sound are elicited from the non-metallic atoms of the atmosphere.

D is the malleus. It is made to compress the atoms of the air suddenly upon the facial incus and evoke the silence therefrom.

E is a hole drilled in the center of the facial malleus, called the "phonic fossa." It regulates the phonic units and directs them through the incus.

F is the tympanum, which generates the various intensities of sound by striking the facial malleus and phonic fossa upon the facial incus from various distances therefrom.

G is the key by means of which the operator strikes off all phonic formulæ classed under the different orders of sound.

H is the orbicular. It receives the various sounds from the opposite side and inducts them into the nervous papillæ of the index-finger tips, one of which must be pressed upon it by the auditor, who thus receives them from the operator.

I is the stapes. It is mounted over the incus to give strength and support to the tympanum and key.

K is a metallic rim, which encircles the edge of the incus and retains it in its place. The incus is composed of solid copper, which, for practical purposes, ought to be bell-metal. The malleus is of iron, the orbicular also, and should be polished. The tympanum is of steel; the stapes of copper, with projecting feet screwed upon the pedestal.

L is the left diatonic staff. It has five bars, from each one of which a different order of sound proceeds, and each order is represented by a different symbol. The bars are placed at different distances from the facial incus, and also from one another, and together their sounds express all the letters of the alphabet.

The first bar, No. 1, is placed one-eighth of an inch from the facial incus, and creates the vowel order of sounds, M. Its symbol is a circular cavity, O, painted green. One such symbol expresses the phonic formula of the letter A. Two such symbols express the letter E, and so on to Y, thus:

| | Symbols. | Sounded. | | Phonic formula of |
|---|---|---|---|---|
| 1 such | O | " | = | A |
| 2 " | OO | " | = | E |
| 3 " | OOO | " | = | I |
| 4 " | OOOO | " | = | O |
| 5 " | OOOOO | " | = | U |
| 6 " | OOOOOO | " | = | Y |

These symbols are sounded continuously from the first bar as quick as one, one, two, one, two, three, &c., can be counted.

The second bar, No. 2, is placed four-eighths of an inch from the facial incus, and generates the mute order of sounds. N, its symbol, is a solid cube painted yellow. ■ One such symbol expresses the phonic formula of B, and so on, thus:

| | Symbols. | Sounded. | | Phonic formula of |
|---|---|---|---|---|
| 1 such | ■ | " | = | B |
| 2 " | ■ ■ | " | = | C |
| 3 " | ■ ■ ■ | " | = | D |
| 4 " | ■ ■ ■ ■ | " | = | F |
| 5 " | ■ ■ ■ ■ ■ | " | = | G |

These symbols are also sounded consecutively from the second bar as quickly as one, one two, one two three, &c., on to five, can be counted. The greater distance of the bar from the incus gives a more intense strike, and thus creates a new order of sound.

The third bar, No. 3, is placed six-eighths of an inch from the facial incus, and produces the semi-sound order of sounds. O, its symbol, is a hollow cube, □, painted blue. One such symbol expresses the letter H, onward to M, thus:

| | Symbols. | Sounded. | | Phonic formula of |
|---|---|---|---|---|
| 1 such | □ | " | = | H |
| 2 " | □ □ | " | = | J |
| 3 " | □ □ □ | " | = | K |
| 4 " | □ □ □ □ | " | = | L |
| 5 " | □ □ □ □ □ | " | = | M |

These symbols are also sounded continuously until the letter intended to be expressed has been fully sounded.

The fourth bar, No. 4, is placed one inch from the facial incus, and incepts the consonant order of sounds. P, its symbol, is a red disk. One such symbol denotes the letter N, onward to S, thus:

| | Symbols. | Sounded. | | Phonic formula of |
|---|---|---|---|---|
| 1 such | ● | " | = | N |
| 2 " | ● ● | " | = | P |
| 3 " | ● ● ● | " | = | Q |
| 4 " | ● ● ● ● | " | = | R |
| 5 " | ● ● ● ● ● | " | = | S |

The fifth bar, No. 5, is placed one and one-fourth inch from the facial incus, and produces the relative order of sounds. Q, its symbol, is the arithmetical multiplier × painted black. One such symbol sounds the phonic formula of T, onward to &, in this way:

|   | Symbols. | Sounded. | Phonic formula of |
|---|---|---|---|
| 1 such | × | " = | T |
| 2 " | ×× | " = | V |
| 3 " | ××× | " = | W |
| 4 " | ×××× | " = | X |
| 5 " | ××××× | " = | Z |
| 6 " | ×××××× | " = | & |

As in the other instance, so in this, the comma is silent after each symbol forming a letter is sounded; but after the formula of any letter has been completed the silent semicolon must be observed.

In writing out the symbolic language of the phonographic locmanaud, the exponent is placed over the symbol to prevent repetition, which is so necessary in sounding. Thus X is denoted by $\overset{4}{\times}$; T is denoted by $\overset{1}{\times}$; and so also of all other letters. "Mexico" is written thus: $\overset{5}{\square}$; $\overset{2}{O}$; $\overset{4}{\times}$; $\overset{3}{O}$; $\overset{2}{\blacksquare}$; $\overset{4}{O}$: and sounded in this way: □,□,□,□,□; O,O; ×,×,×,×; O,O, O; ■,■; O,O,O,O: the silent comma after each symbol, the semicolon after each formula, the colon after each word, and the period follows each sentence.

R is the right diatonic staff. It has four bars, from each one of which a different order of sound is generated, and each order is represented by a different symbol. The bars are placed at different distances from the facial incus and from one another, and, what must always be observed, the bars must be intermediate to those which form the left diatonic staff. Together these four orders of sound express ciphers, digits, counts, minutes, hours, dollars, days, months, years, ounces, pints, gallons, inches, yards, miles.

The first bar, No. 1, is placed two-eighths of an inch from the facial incus, and creates the fulcimen order of sounds. S, its symbol, is the algebraic $x$ painted black. One such symbol expresses the phonic formula of the figure 1, and so on to 9, in this way:

|   | Symbols. | Sounded. | Phonic formula. |
|---|---|---|---|
| 1 such | $x$ | " = | 1 |
| 2 " | $xx$ | " = | 2 |
| 3 " | $xxx$ | " = | 3 |
| 4 " | $xxxx$ | " = | 4 |
| 5 " | $xxxxx$ | " = | 5 |
| 6 " | $xxxxxx$ | " = | 6 |
| 7 " | $xxxxxxx$ | " = | 7 |
| 8 " | $xxxxxxxx$ | " = | 8 |
| 9 " | $xxxxxxxxx$ | " = | 9 |

The symbols are sounded from the first bar, and are governed by the silent comma after each signal is sounded, by the silent semicolon after each formula, and mounted by their exponents to prevent repetition.

The third bar, No. 3, is placed five-eighths of an inch from the facial incus, and generates the semi-fulcimen order of sounds, T. Its symbol is the geometric sphere ○ painted black. One such symbol expresses the phonic formula of the figure 0 onward, in this way:

|   | Symbols. | Sounded. |   |   | Phonic formula of |
|---|---|---|---|---|---|
| 1 such | ○ | " = | 1 | " | cipher 0 |
| 2 " | ○○ | " = | 2 | " | 00 |
| 3 " | ○○○ | " = | 3 | " | 000 |
| 4 " | ○○○○ | " = | 4 | " | 0000 |
| 5 " | ○○○○○ | " = | 5 | " | 00000 |

In combining sounds from the first and third bars, U, other orders of fulcimen sounds are produced, so that millions in number may be increased to the mathematical figures used in astronomy, and be quickly and understandingly expressed.

The term "fulcimen" is employed by mathematicians in speaking of the relations that digits have to ciphers, derived from the verb *fulcio*, to prop, the cipher standing for nothing unless propped by a digit, which receives, as it gives, a value.

The second bar, No. 2, is placed three-eighths of an inch from the facial incus, and produces the valorum order of sounds, V. Its symbol is the astronomic Taurus, ♉, painted black. One such symbol expresses the phonic formula of minutes to years, and of cents to dollars, in the following manner:

|   | Symbols. | Sounded. | Phonic formula of |
|---|---|---|---|
| 1 such | ♉ | " = | Minutes. |
| 2 " | ♉ ♉ | " = | Cents. |
| 3 " | ♉ ♉ ♉ | " = | Hours. |
| 4 " | ♉ ♉ ♉ ♉ | " — | Dollars. |
| 5 " | ♉ ♉ ♉ ♉ ♉ | " = | Days. |
| 6 " | ♉ ♉ ♉ ♉ ♉ ♉ | " = | Months. |
| 7 " | ♉ ♉ ♉ ♉ ♉ ♉ ♉ | " = | Years. |

In writing valuations the exponent is placed over the symbol, which also is governed by the silent commas after each sound, and by semicolons after the formula is completed, and in all cases the valorum symbols must always be sounded before the fulcimen, and semi-fulcimen sounds express the amounts.

The fourth bar, No. 4, is placed seven-eighths of an inch from the facial incus, and generates the semi-valorum order of sounds, W. Its symbol is the astronomic Venus, ♀, painted black. One such symbol denotes the phonic formula of ounces to pounds, of pints to gallons, of inches to miles:

|   | Symbols. | Sounded. | Phonic formula of |
|---|---|---|---|
| 1 such | ♀ | " = | Ounces. |
| 2 " | ♀ ♀ | " = | Pounds. |
| 3 " | ♀ ♀ ♀ | " = | Pints. |
| 4 " | ♀ ♀ ♀ ♀ | " = | Gallons. |
| 5 " | ♀ ♀ ♀ ♀ ♀ | " = | Inches. |
| 6 " | ♀ ♀ ♀ ♀ ♀ ♀ | " = | Yards. |
| 7 " | ♀ ♀ ♀ ♀ ♀ ♀ ♀ | " = | Miles. |

The same rules govern the semicolon order of sounds which do the valorum order as regards the silent diatessarons and precedence of enunciation.

The second form of construction relates to the phonographic locmanaud intended for the use of clergymen, who operate with it from the desk of the pulpit. The incus is of much larger caliber, so as to admit of a much larger malleus on one face of it, while the other face, opposed to it at the other end, more conveniently receives the copper cap, in which all the necessary wires are inserted, and which takes the place of one of the mallei, as represented, the acouglottic battery of which is double, having two tympani, two keys, two mallei, two facial inci, two stapes, two right diatonic and two left diatonic staves, while the one for clerical purposes has only one facial incus, which is operated on, while the other communicates the various sounds to the copper cap, which conducts them through the wires to the audience. It therefore has only one malleus, one tympanum, one stapes, one right and one left diatonic staff, and one key, minus the orbicular. The length, however, of the incus is to correspond with its diameter.

The operations of the phonographic locmanaud for parlor purposes are to be conducted as follows: The seats of the two deaf and dumb persons must be elevated in such a way that both the operator and the auditor may have full view and command over the key and bars of the locmanaud, which is placed between them upon a table, and the arm of each must be so supported by the table as to be free to move and act and rest while the conversation is going on. The head and chest must be upright, dignified, natural, and slightly inclined forward. The left index-finger tip must be always the one to receive sounds from the orbicular, and the right index-tip the one always to receive the key. An essential rule also to be observed is that the pulpy tips of the left index-finger and thumb shall be kept moist and clean, and that the nail shall never come in contact with the orbicular during the time of receiving sounds. The surface-head of the orbicular must also be kept bright and clean, and the greatest care be taken in bringing the edge of the facial malleus directly opposite the points of the bars, from which the phonic formula of all symbols proceed. Now, let one of the deaf and dumb place the pulpy tip of his finger upon the orbicular and the other place his right index-tip under the key of the tympanum on the opposite side; then, drawing the facial edge of the malleus directly opposite the projecting point of the first bar on the left diatonic staff, and permitting the key to suddenly slip from the finger-tip, a characteristic sound is elicited. The mind is tutored to know that a more intense sound expresses a different set of letters, and, by placing the various orders before the deaf and initiating him into the various intensities and modes of dividing them by silent diatessarons, he soon learns the principles and practices of the locmanaud.

In parlor conversations, therefore, and pulpit communications, the following examples will suffice to explain the whole operations of the locmanaud, exponents directing the number of sounds for each letter, and the diatessarons the complete formula of each letter, word, and sentence. "God is love" is thus expressed by sounds: $\blacksquare^5$; $\bigcirc^4$; $\blacksquare^3$: $\bigcirc^3$; $\bullet^5$: $\square^4$; $\bigcirc^4$; $\times^2$; $\bigcirc^2$. Referring to the tables of phonic formulæ, it is found that five similar sounds are to be elicited, directly one after the other, from the second bar on the left diatonic staff, and that, a silent semicolon being observed by the operator, the letter "G" has been enunciated; that four dissimilar sounds are to be evoked from the first bar, and the same silent stop respected, when the letter "O" will have been expressed; that three sounds similar to the first, but dissimilar to the second, are to be struck from the second bar, and the silent colon now indicates that not only the letter "D" has been sounded, but that this letter ends a word. Immediately after one, two, three has been counted the operator strikes off three more of the vowel order of sounds, and "I" is formed by sound; then five from the fourth bar, and the silent colon again indicates that not only is the latter "S" sounded, but that it completes a word. Having counted one, two, three, the operator at once strikes four sounds from the third bar, and by following it up, after counting one, two, by four sounds from the first bar, demonstrates that the letter "L" not only has been expressed, but that it is a part of a word. Then follows two sounds from the fifth bar and two sounds from the first bar, which, being followed by the silent period, indicates that the sentence has been formed and completed.

"Truth will prevail" is thus written and expressed: $\times^1$; $\bullet^4$; $\bigcirc^5$; $\times^1$; $\square^1$: $\times^3$; $\bigcirc^3$; $\square^4$; $\square^4$: $\bullet^2$; $\bullet^4$; $\bigcirc^2$; $\times^2$; $\bigcirc^1$; $\bigcirc^3$; $\square^4$. The $\times^1$; $\square^1$; $\bigcirc^2$: deaf $\blacksquare^3$; $\bigcirc^2$; $\bigcirc^1$; $\blacksquare^4$: hear $\square^1$; $\bigcirc^2$; $\bigcirc^1$; $\bullet^4$: the $\times^1$; $\square^1$; $\bigcirc^2$: dumb $\blacksquare^3$; $\bigcirc^5$; $\square^5$; $\blacksquare^1$: speak $\bullet^5$; $\bullet^2$; $\bigcirc^2$; $\bigcirc^1$; $\square^3$: they $\times^1$; $\square^1$; $\bigcirc^2$; $\bigcirc^6$: converse $\blacksquare^2$; $\bigcirc^4$; $\bullet^1$; $\times^2$; $\bigcirc^2$; $\bullet^4$; $\bullet^5$; $\bigcirc^2$: together $\times^1$; $\bigcirc^4$; $\blacksquare^5$; $\bigcirc^2$; $\times^1$; $\square^1$; $\bigcirc^2$; $\bullet^4$: by means of the $\blacksquare^1$; $\bigcirc^6$: $\square^5$; $\bigcirc^2$; $\square^1$; $\bullet^1$; $\bullet^5$: $\bigcirc^4$; $\blacksquare^4$: Everitt $\bigcirc^2$; $\times^2$; $\bigcirc^2$; $\bullet^4$; $\bigcirc^3$; $\times^1$; $\times^1$: Phonographic $\bullet^2$; $\square^1$; $\bigcirc^4$; $\bullet^1$; $\bigcirc^4$; $\blacksquare^5$; $\bullet^4$; $\bigcirc^1$; $\bullet^2$; $\square^1$; $\bigcirc^3$; $\blacksquare^2$: Locmanaud $\square^4$; $\bigcirc^4$; $\blacksquare^2$; $\square^5$; $\bigcirc^1$; $\bullet^1$; $\bigcirc^5$; $\bigcirc^3$; $\blacksquare$.

In sending communications, however, and conversing with the distant by means of a copper wire, the phonic formulæ of several letters differ, and they are placed under different symbols; but the form of the symbols corresponds with those used for preceding purposes, and the diatessarons are shaped by seconds of time, instead of counting numbers.

The following instance and example will explain the operation of transmitting sounds:

<sup>8</sup> <sup>1</sup> <sup>2</sup>    <sup>3</sup> <sup>1</sup> <sup>8</sup>    <sup>7</sup> <sup>8</sup> <sup>1</sup> <sup>6</sup>    <sup>2</sup> <sup>6</sup> <sup>4</sup> <sup>4</sup>
□,●,○:  □,○,○:  ●,□,○,●:  ●,●,○,●:
  The       day       star      from <sup>4</sup> <sup>5</sup>   <sup>1</sup> <sup>3</sup> <sup>4</sup> <sup>1</sup>   <sup>1</sup> <sup>1</sup> <sup>8</sup> <sup>1</sup>
○, ●:  ●, ○, □, ●:  ●, ○, □, ●:
  on       high       hath <sup>9</sup> <sup>3</sup> <sup>7</sup>   <sup>3</sup> <sup>8</sup> <sup>2</sup> <sup>3</sup>   <sup>6</sup> <sup>7</sup>   <sup>1</sup> <sup>5</sup> <sup>3</sup>
□, ○, ●, ○, □, ○, □:  ○, ●:  ○, ●, □:
  visited      us;    and <sup>7</sup> <sup>2</sup> <sup>1</sup> <sup>2</sup> <sup>2</sup>   <sup>1</sup> <sup>1</sup> <sup>7</sup>   <sup>1</sup> <sup>2</sup> <sup>2</sup> <sup>5</sup>
□, ○, ○, □, ○:  ●, ○, ●:  □, ○, ○, ●:
  peace     has      been <sup>7</sup> <sup>6</sup> <sup>4</sup> <sup>2</sup> <sup>3</sup> <sup>1</sup> <sup>3</sup> <sup>4</sup> <sup>2</sup> <sup>3</sup>
□,●,○,□,●,○,○,●,○,□.
    proclaimed.

The manner of sounding "these symbols" is as follows, the silent diatessarons being understood as being diverted into written commas equal to two seconds of time by the watch, into colons equal to four seconds, and into periods of six seconds of time, and into a diatessaron equal to one second of time, never to be used except in sounding and separating one symbol from another forming a letter: Thus, in sounding from the bar of the second incus the eight sounds of "T" one second of time by the watch separates each of the eight symbols from one another, and the silent commas finish that letter, and it will take nine (9) seconds of time to sound that letter and to begin the next. "H" is then sounded, and expressed by one sound from the bar of the third incus, and occupies three (3) seconds of time to complete that letter and commence the next. "E" is then sounded, and expressed from the bar of the first incus by two sounds, and occupies five seconds of time, denoting the completion of the word "The." The same rule applies to all the various other letters, their symbols and sounds. A diatessaron equal to ten seconds would sufficiently indicate the completion of a sentence, and on an average more than two words per minute might be transmitted across the ocean.

What I claim as my invention, and desire to secure by Letters Patent, is—

1. Two phonographic locmanauds mounted by acouglottic batteries—names implying machines which generate intelligent sounds, which they communicate to the spiritual sense of hearing through the nervous papillæ of the index-finger and thumb tips and through the acoustic trumpet of the external ear, being the natural parts of the body which have direct relationship therewith, so that persons who are deaf and dumb and blind—arising either from physical defects or from length of distances—may hear and hold converse together by means of these locmanauds and copper wires attached thereto.

2. The method of evoking these intelligent sounds, as herein described, using for that purpose the inci, the mallei, the phonic fossæ, the tympani, and keys.

3. The mode of intensifying and modifying sounds and chimes systematically by means of a right diatonic staff and a left diatonic staff, or one single diatonic staff, as herein described, using for that purpose bars of wire projecting from the staff and placed at different distances from one another and from the facial incus, and striking the facial malleus upon the facial incus from the projecting points of these bars, and in this way evoking similar and dissimilar sounds.

4. The method of assorting similar and dissimilar intensities of sounds under symbolic formulæ representing the various letters of the alphabet, Arabic notations, &c., and dividing them into certain divisions, each division of which represents a separate and distinct order of sound, as herein described, using for that purpose geometric, Arabic, and arithmetical figures, and also the mode of separating sounds by silent diatessarons, giving force and decided character to a phonic letter, or notation, or valuation.

5. The method of communicating sermons to a deaf and dumb audience by means of a radiating locmanaud, as herein described, using for that purpose one cylindrical incus supported by its pedestal, its anterior face pressed by the facial malleus, which is attached to the tympanum and key, and all supported by the stapes, its posterior face capped by the instrument of radiating wires, and in this way evoking sounds upon the facial incus, which directs them simultaneously into all the radiating wires centered in the copper cap which covers the posterior face of the incus.

LANCELOT HOPE EVERITT.

Witnesses:
  EDM. F. BROWN,
  J. H. PHILLIPS.